July 5, 1932.  H. A. CRUZ  1,865,457
METALLIC SPRING TIRE
Filed Nov. 15, 1927
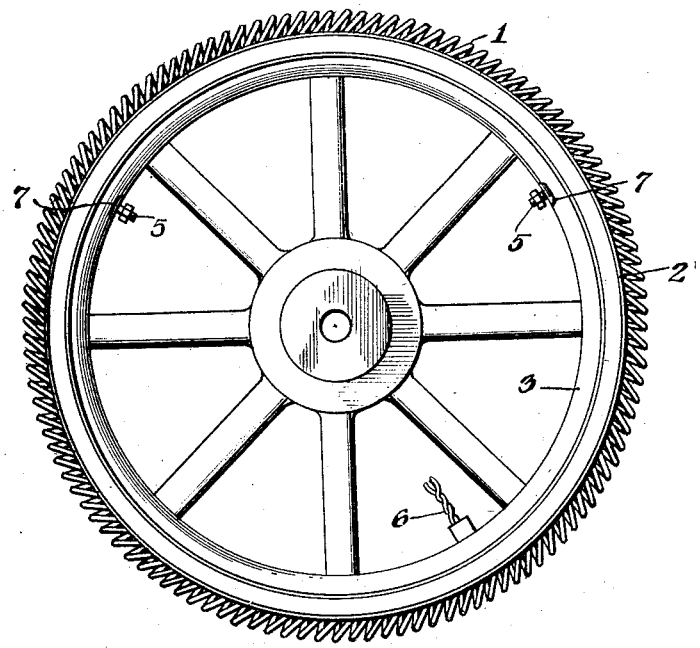
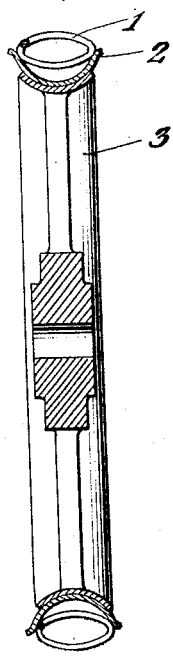
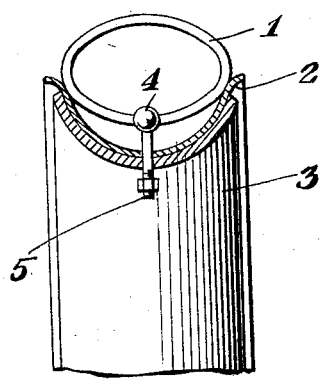
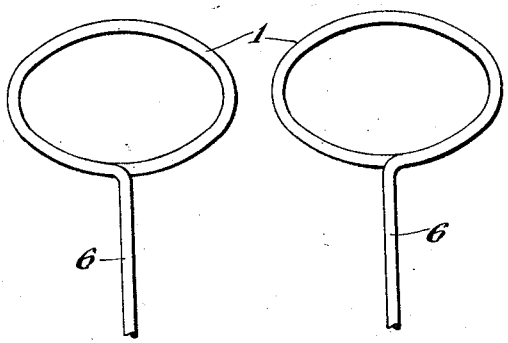
INVENTOR
Hector Armando Cruz
BY
ATTORNEY Patented July 5, 1932

1,865,457

UNITED STATES PATENT OFFICE

HECTOR ARMANDO CRUZ, OF BUENOS AIRES, ARGENTINA

METALLIC SPRING TIRE

Application filed November 15, 1927, Serial No. 233,418, and in Argentina July 23, 1927.

My invention relates to a new metallic spring tire for use in all classes of vehicle wheels, in the same manner as pneumatic and solid rubber tires, substituting the inner and outer tires in the former case and the solid tire only in the latter with great advantages, both as regards price, which is much lower than the tires in current use, as also on account of its durability and easy maintenance, and above all, because it eliminates dangerous and constant punctures.

In order that my application may be more easily understood, I have illustrated same with various figures, in which:

Fig. 1 is a side view of a wheel, showing the spring tire fixed in position on the rim of the wheel and over an absorbing bed, which may be of leather, rubber, etc.

Fig. 2 is a transverse sectional view showing the spring tire fixed in the rim of the wheel over the absorber.

Fig. 3 is a view of the ends of the spring forming the half spires.

Fig. 4 is a sectional view of a detail showing the soldering of the fasteners of the spring tire.

The construction consists in winding a wire (1) over a cylinder; once the latter is removed, parts of the two ends (Fig. 3) are straightened, in order that each end shall form a half spire, which on being joined, form a perfect closing. The extreme ends (6) are twisted and then soldered by oxygen. Once the ends are joined in the manner already described, and by which means an annulus has been formed of the spring, this is pressed in a special press for the object formed by two rollers with round channels, by which the spires of the spring (1) which fall perpendicularly are made to take an inclined form, as shown in Fig. 1.

The annulus formed by the spring should be less in diameter than that of the edges of the rim (3) on which it is to be placed, so that the pressure under which it enters will maintain it securely pressed on the borders of same, and leaving a distance between the bed and the spires which will allow its free balancing, a certain distance separating at the same time said spires (Fig. 1).

Before the spring (1) is made to penetrate into the rim (3) of the wheel, the absorbing bed (2), which, as has already been stated, may be of leather, rubber, etc., (Figs. 1, 2 and 4,) is fixed to said wheel. The closing (6) should be introduced in the hole at present intended for the valve.

Once the spring (1) has been placed in its position (3), and in spite of the fact that its pressure secures its strongly, in order to obtain still greater safety, nuts and pins (5) are added, the latter of which are each soldered by oxygen to one of the spires at the point marked (4) in Fig. 4.

As will be seen in said figure and also in Fig. 1, the nuts are not tightened; a space is left free to allow the play of the spire on being pressed.

These pins are introduced in the rim (3) in a lengthened hole (7) in order to allow their movement (Fig. 1). As can be seen in said figure, these pins and nuts (5) may be two in number, or more is necessary.

The joint or union of the two ends 6 of the spires formed by twisting said ends and soldering them is introduced into the rim of the wheel, as stated already, by the aperture at present intended for the valve.

The spring is of one piece.

The diameter of the spires should be the same as the width of the rim (3) in which it is to be placed; the latter should be of channel form, as shown in Figs. 2 and 4.

The thickness of the wire (1) and the quality of same, as also its temper, will be in relation to the load to be carried, and with the greater inclination of its spires, which should always be in a sense opposite to the direction of travel a more or less flexible spring tire will be obtained.

The working consists in that the spring (1) having inclined spires, these yield at the moment they touch the ground, and the greater the load to be carried, the more will be the spires that come into play, which immediately return to their original position, on account of the elasticity which they possess, by reason of their inclination.

What I claim is:

A metallic tire for vehicle wheels comprising a perforated and concaved rim, a coil spring having its convolutions disposed at an oblique angle to said rim and extending over the entire outer periphery thereof, said spring seated in said concaved rim, a bed of resilient material having outwardly flaring borders on which said convolutions rest in spaced relation to the bottom of the cavity thereof to increase the resiliency of the wheel, means for securely holding the inner parts of said convolutions in position in said rim, and means for securely holding the ends of said spring together after their passage through one of the perforations in said rim.

In testimony whereof I affix my signature.

HECTOR ARMANDO CRUZ.